(12) United States Patent
Okanaka et al.

(10) Patent No.: US 7,044,456 B2
(45) Date of Patent: May 16, 2006

(54) FLUID-FILLED VIBRATION-DAMPING DEVICE HAVING GAS-RETAINING HOLE

(75) Inventors: Takehiro Okanaka, Kasugai (JP); Tetsuji Andou, Inuyama (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/703,329

(22) Filed: Nov. 6, 2003

(65) Prior Publication Data

US 2004/0119214 A1    Jun. 24, 2004

(30) Foreign Application Priority Data

Nov. 18, 2002 (JP) .............................. 2002-333565

(51) Int. Cl.
*F16F 13/00* (2006.01)

(52) U.S. Cl. ................................. 267/140.13; 267/219

(58) Field of Classification Search ........... 267/140.11, 267/140.13, 140.14, 219

See application file for complete search history.

(56) References Cited

U.S. PATENT DOCUMENTS

| | | | |
|---|---|---|---|
| 5,735,510 A | 4/1998 | Takehara et al. | |
| 5,823,515 A | 10/1998 | Takehara et al. | |

FOREIGN PATENT DOCUMENTS

| | | | |
|---|---|---|---|
| JP | 60/139507 | 7/1985 | |
| JP | 8-54038 | 2/1996 | |
| JP | 8-58396 | 3/1996 | |
| JP | 8-128497 | * 5/1996 | |
| JP | 08-254243 | * 10/1996 | |

* cited by examiner

*Primary Examiner*—James McClellan
*Assistant Examiner*—Bradley King
(74) *Attorney, Agent, or Firm*—Beyer Weaver & Thomas LLP

(57) ABSTRACT

A fluid-filled vibration-damping device including: a first mounting member; a second mounting member; an elastic body elastically connecting the first and second mounting members and defining a fluid-sealing area filled with a non-compressible fluid; and a gas-retaining hole open to the fluid-sealing area through an opening thereof, and capable of retaining a predetermined volume of gas therein with the opening thereof facing vertically upward within the non-compressible fluid. A method of manufacturing the fluid-filled vibration-damping device is also disclosed.

8 Claims, 8 Drawing Sheets

FLUID-FILLED VIBRATION-DAMPING DEVICE HAVING GAS-RETAINING HOLE

INCORPORATED BY REFERENCE

The disclosure of Japanese Patent Application No. 2002-333565 filed on Nov. 18, 2002 including the specification, drawings and abstract is incorporated herein by reference in its entirety.

BACKGROUND OF THE INVENTION

1. Field of the Invention

The present invention relates generally to fluid-filled vibration-damping devices capable of exhibiting damping effect on the basis of flows of fluid sealed therein. More specifically, the present invention is concerned with a fluid-filled vibration-damping device of novel structure, which is suitably applicable to an engine mount, a body mount, a suspension bushing and other equipments for use in automotive vehicles, for example. The present invention is also concerned with a novel manufacturing method of the fluid-filled vibration-damping device.

2. Description of the Related Art

A fluid-filled vibration-damping device is known as one type of a vibration-damping device, which is interposed between two members of a vibration system so as to flexibly connect these two members or mount one of these members on the other member in a vibration-damping fashion. The fluid-filled vibration-damping device includes a fluid-sealing area filled with a non-compressible fluid and subjected to a vibrational load applied thereto, and exhibits damping effect on the basis of flows of the non-compressible fluid within the fluid-sealing area, in the event of application of a vibrational load to the fluid-sealing area. Attempts have been made for applying the fluid-filled vibration-damping device to an engine mount, a body mount, a suspension bushing, and other equipments for use in automotive vehicles. As one measure of further improvement of damping characteristics of the fluid-filled vibration-damping device, it has been proposed to put a predetermined volume of gas into the fluid-sealing area. An example of such a fluid-filled vibration-damping device is disclosed in the following patent publications 1 and 2, and other publications, for example.

[Patent Publication 1]

JP-A-8-54038

[Patent Publication 2]

JP-A-60-139507

In the fluid-filled vibration-damping device as disclosed in the above-listed publications, damping characteristics vary depending on a volume of gas put into the fluid-sealing area. For this reason, important is a precise control of the volume of gas injected into the fluid-sealing area. For mass production, important are of course to facilitate a manufacturing method of the vibration-damping device, as well as to simplify manufacturing facilities.

However, the above-mentioned importance have not been taken into account enough, upon designing the known fluid-filled vibration-damping device of conventional structure.

More specifically, the fluid-filled vibration-damping device disclosed in patent publication 1, has a structure in which a plurality of members are mutually assembled within a mass of a non-compressible fluid to provide the fluid-sealing area, and one of the members is formed with a large recess open to the fluid-sealing area with its opening facing vertically downwardly so that a volume of gas is retained in the large recess. However, the fluid-filled vibration-damping device disclosed in patent publication 1 is not provided with a special structure to make a volume of gas retained in the large recess constant. This makes it extremely difficult to control the volume of gas put into the fluid-sealing area. As one means of control of the volume of gas contained in the fluid-sealing area, it would be conceivable to inject a given volume of gas from an external area into the fluid-sealing area filled with the non-compressible fluid. This means, however, additionally needs a special equipment for measuring and injecting a given volume of gas, resulting in complicated manufacturing facilities, and making it difficult to manufacture the fluid-filled vibration-damping device due to increased number of steps of manufacture.

The above-listed patent publications 1 and 2 disclose another means to hold the volume of gas contained in the fluid-sealing area in constant. According to this means, a ball-shaped member of hollow structure made of an elastic layer is filled with a given volume of gas, and then is housed within the fluid-sealing area filled with the non-compressible fluid. This means, however, additionally needs special apparatus and methods of manufacturing the ball-shaped structure, making it difficult to actually practice this means. Additionally, the presence of the elastic layer of the ball-shaped structure separates the given volume of gas contained in the ball-shaped structure from the non-compressible fluid, possibly deteriorating intended damping effect expected by putting the gas into the non-compressible fluid.

SUMMARY OF THE INVENTION

It is therefore one object of this invention to provide a fluid-filled vibration-damping device of novel structure, which is capable of precisely setting a volume of gas put into a fluid-sealing area, and which is easy to manufacture without needing additional complicated manufacturing apparatus.

It is another object of this invention to provide a novel manufacturing method of the fluid-filled vibration-damping device of the present invention.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. Every elements adopted in these modes may be adoptable in any other possible combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first aspect of the invention provides: (1) a fluid-filled vibration-damping device comprising: a first mounting member; a second mounting member; an elastic body elastically connecting the first and second mounting members and defining at least partially a fluid-sealing area filled with a non-compressible fluid that is forced to flow within the fluid-sealing area upon application of a vibrational load to the fluid-sealing area so as to exhibit vibration-damping effect; and at least one gas-retaining hole open to the fluid-sealing area through an opening thereof, and capable of retaining a predetermined volume of gas therein with the opening thereof facing vertically upward within the non-compressible fluid.

In the fluid-filled vibration-damping device constructed according to the present mode, the at least one gas-retaining hole is capable of preventing entry of the non-compressible fluid into its interior space, even if a component provided with the at least one gas-retaining hole is immersed within a mass of the non-compressible fluid, with an opening of the gas-retaining hole facing vertically upward, or alternatively if the non-compressible fluid is poured into a recessed portion defining the fluid-sealing area in which the at least one gas-retaining hole is opened. Therefore, the fluid-sealing area can be formed with the gas-retaining hole incorporated as a part, in which a predetermined volume of gas corresponding to a volume of the hole is retained in the at least one gas-retaining hole. To fill the at least one gas-retaining hole, air, an inert gas, and other possible gasses may be preferably employed in view of required damping characteristics of the vibration-damping device.

The aforesaid features of the invention makes it possible to put a predetermined volume of gas into the fluid-sealing area with high stability, since the fluid-sealing area is formed with the at least one gas-retaining hole filled with the predetermined volume of gas incorporated. In this respect, the fluid-sealing area can stably contain a desired volume of gas by only suitably adjusting the volume of the at least one gas-retaining hole. Consequently, the fluid-filled vibration-damping device of this mode is able to exhibit an intended damping effect based on the gas put into the fluid-sealing area.

Further, gas-retaining force or performance of the at least one gas-retaining hole is simply exhibited on the basis of surface tension of the non-compressible fluid, friction or resistance to enter of the fluid into the at least one gas-retaining hole, or the like, thereby eliminating a need for complicated structure or specific operation for retaining the gas in the at least gas-retaining hole. Thus, the fluid-filled vibration-damping device of this mode can be easily manufactured by utilizing existing manufacturing systems or lines that have been used for manufacturing known fluid-filled vibration-damping device in which no gas is contained in the fluid-sealing area.

One preferred mode of the first aspect of the invention provides: (2) a fluid-filled vibration-damping device according to the aforementioned mode (1), wherein the at least one gas-retaining hole is adapted to discharge the predetermined volume of gas retained therein from the opening thereof into the fluid-sealing area in an event of application of a given external force to the device. According to this mode of the invention, the predetermined volume of gas is discharged from the at least one gas-retaining hole into the fluid-sealing area, permitting the predetermined volume of gas to effectively be held in contact with the non-compressible fluid. Thus, the fluid-filled vibration-damping device of this mode can further enjoy the advantages of the invention with the help of the gas contained in the fluid-sealing area.

A magnitude of the given external force needed to discharge the gas retained in the at least one gas-retaining hole into the fluid-sealing area may vary depending on the diameter, shape and size of the gas-retaining hole, density or viscosity of the non-compressible fluid, and affinity of the sealed gas (vapor phase) for the member defining the gas-retaining hole (solid phase) and the non-compressible fluid (liquid phase), for example. Generally, the fluid-filled vibration-damping device is subjected to impact or oscillating force, which has energy enough to discharge the gas from the gas-retaining hole against the gas-retaining force exhibited by the gas-retaining hole. Therefore, the diameter, shape and size of each gas-retaining hole may be determined giving overall consideration to magnitude of the given external force. In this regards, once the gas is discharged from the gas-retaining hole, it is effectively prohibited for the gas to reenter into the gas-retaining hole due to effect of surface tension of the liquid phase presented on the opening of the gas-retaining hole, or the like.

Another preferred mode of the first aspect of the invention provides: (3) a fluid-filled vibration-damping device according to the aforementioned mode (1) or (2), wherein a wall of the fluid-sealing area is partially defined by a rigid member, and the at least one gas retaining hole is formed into a portion of the wall in which deformation due to a force applied thereto is prevented by means of the rigid member. This arrangement makes it possible to further precisely determine or measure the volume of the gas to be introduced into the fluid-sealing area. The rigid member partially defining the fluid-sealing area may be provided by means of a rigid member bonded to the elastic body, or alternatively by utilizing the first and the second mounting members, which are generally made of metal. The at least one gas-retaining hole may be formed into the elastic body, provided elastic deformation of the vicinity of the gas-retaining hole is restricted by the rigid member. Alternatively, the at least one gas-retaining hole may be formed into a portion of the elastic body, which portion does not undergo elastic deformation upon application of a vibrational load between the first and second mounting members. For instance, the gas-retaining hole may be formed into an elastic body filling a recess formed in the rigid member. The inner surface of the gas-retaining hole may be formed of an elastic material such as rubber and a synthetic resin material so that gas-retaining force or performance of the gas-retaining hole can be easily adjusted by suitably selecting a kind of rubber materials or synthetic resin materials.

Yet another preferred mode of the first aspect of the invention provides: (4) a fluid-filled vibration-damping device according to any one of the aforementioned modes (1)–(3), wherein the fluid-sealing area includes a pressure-receiving chamber partially defined by the elastic body and an equilibrium chamber partially defined by a flexible layer and held in fluid communication with the pressure-receiving chamber through an orifice passage, and the at least one gas-retaining hole is open to the pressure-receiving chamber of the fluid-sealing area. There has been employed a method of assembling a plurality of members within a mass of non-compressible fluid in order to fill the fluid-sealing area with the non-compressible fluid at the same time when the fluid-sealing area is formed, as disclosed in patent publication 1 (JP-A-8-54038). The fluid-filled vibration-damping device of this mode can be manufactured by this known method without needing a specific gas blowing apparatus for blowing gas into the fluid-sealing area, which has been required in the vibration-damping device as disclosed in JP-A-8-54038. According to this mode of the invention, a fluid-filled vibration-damping device with an gas mixed fluid chamber can be manufactured by utilizing existing manufacturing facilities for manufacturing the conventional fluid filled vibration-damping device with an gas mixed fluid chamber, approximately as it is.

Still another preferred mode of the first aspect of the invention provides: (5) a fluid-filled vibration-damping device according to any one of aforementioned modes (1)–(4), wherein at least one gas-retaining hole comprises a plurality of gas-retaining holes, and the plurality of gas-retaining holes are oriented to be open in a same direction. The use of the plurality of gas-retaining holes makes it possible to retain a relatively large volume of gas with high stability. In the event when the gas is discharged from the gas-retaining holes into the fluid-sealing area according to the aforementioned mode (2), the presence of the plurality of gas-retaining holes ensures in high possibility sufficient gas discharge into the fluid-sealing area. Namely, if one of the gas-retaining hole fails to discharge the contained gas, any or all of the other gas-retaining holes may successively discharge the gas contained therein. Therefore, the fluid-filled vibration-damping device of this mode is able to prevent a significant variation in its damping performance, and to exhibit an excellent damping effect with high stability.

A second aspect of the invention provides: (6) a method of manufacturing a fluid-filled vibration-damping device including: a first mounting member; a second mounting member; an elastic body elastically connecting the first and second mounting members and defining at least partially a fluid-sealing area filled with a non-compressible fluid that is forced to flow within the fluid-sealing area upon application of a vibrational load to the fluid-sealing area so as to exhibit vibration-damping effect, and containing a predetermined volume of gas, said method comprising the following steps: preparing a plurality of pre-assembled components to be assembled together to define the fluid-sealing area; forming at least one gas-retaining hole into at least one of the plurality of pre-assembled components for retaining the predetermined volume of gas therein, the at least one gas-retaining hole being held in open to the fluid-sealing area through an opening thereof, and capable of retaining the predetermined volume of gas therein with the opening thereof facing vertically upward within the non-compressible fluid; turning at least one time the at least one of the plurality of pre-assembled component provided with the at least one gas-retaining hole within a mass of the non-compressible fluid so that the opening of the at least one gas-retaining hole inclines upward with an angle relative to a horizontal; and assembling the plurality of pre-assembled components together within the mass of the non-compressible fluid with the predetermined volume of gas retained within the gas-retaining holes, so as to define the fluid-sealing area and fill the fluid-sealing area with the non-compressible fluid, simultaneously.

The method of the present invention makes it possible to put into the fluid-sealing area the predetermined volume of gas that is corresponding to the volume of the at least one gas-retaining hole, and to fill the fluid-sealing area with the non-compressible fluid, simultaneously. Further, the method of the present invention eliminates a need for special apparatus for measuring the predetermined volume of gas, and for injecting the predetermined amount of gas into the fluid-sealing area, thus facilitating manufacture of the fluid-filled vibration-damping device having the gas-mixed fluid-sealing area.

Furthermore, the method of the present invention can be executed by utilizing a known assembling method executed within a mass of the non-compressible fluid, thus eliminating a need for considerable modifications made on existing manufacturing systems or lines. Accordingly, the method of the present invention makes it possible to manufacture the fluid-filled vibration-damping device having the gas-mixed fluid-sealing area with ease, while precisely determining a volume of the gas put into the fluid-sealing area.

The present invention is suitable for manufacturing especially, the fluid-filled vibration-damping device constructed according to any one of the aforementioned modes (1)–(5) of the present invention. In this regards, each element employed in the fluid-filled vibration-damping device according to any one of the aforementioned modes (1)–(5), may be employed an element of the fluid-filled vibration-damping device in the present method of the invention.

One preferred mode of the second aspect of the invention provides: (7) a method of manufacturing a fluid-filled vibration-damping device according to the aforementioned mode (6), comprising the further step of applying a given external force to the fluid-sealing area after assembling the plurality of pre-assembled components together to define the fluid-sealing area, so as to discharge the predetermined volume of gas retained in the at least one gas-retaining hole from the opening of the gas-retaining hole into the fluid-sealing area. In this mode, examples of the given external force are not limited to force utilized in a production line of the fluid-filled vibration-damping devices, and a variety of external forces may be usable as the given external force. In the case where a manufactured fluid filled vibration-damping device is used as an engine mount, for example, when installed between a power unit and a body of an automotive vehicle, the engine mount is subjected to a weight or static load of the power unit. Accordingly, the weight of the power unit may be employed as the given external force required for discharging the gas retained in the at least one gas retaining hole into the fluid-sealing area. In another case where a manufactured fluid-filled vibration-damping device is installed on a vibration-transmitting path, for example, a vibrational load is exerted on the fluid-filled vibration-damping device. This vibrational load may be employed as the given external force so as to discharge the gas retained in the at least one gas retaining hole into the fluid-sealing area. In either case, additional advantage of the invention is that no special apparatus is needed on the production line in order to apply the given external force to the fluid-filled vibration-damping device.

Another preferred mode of the second aspect of the invention provides: (8) a method of manufacturing a fluid-filled vibration-damping device according to the aforementioned mode (6) or (7), comprising the further steps of: providing the second mounting member in a generally cylindrical shape; disposing the first mounting member to be opposed to one of axially opposite open-end portions of the second mounting member; providing a first pre-assembled component by elastically connecting the first and second mounting members via the elastic body so that the one of axially opposite open-end portions of the second mounting member is fluid-tightly closed by means of a sealing end portion including the first mounting member and the elastic body; providing a second pre-assembled component by a partition structure that is inserted into a bore of the second mounting member from an other one of the axially opposite open-end portions of the second mounting member, and fixed to the second mounting member so as to extend in a direction perpendicular to an axial direction of the second mounting member; providing a third pre-assembled component by a lid structure having a flexible layer, and disposed in and fluid-tightly closing the other one of the axially opposite open-end portions of the second mounting member; fixing the second and the third pre-assembled components with respect to the first pre-assembled component within the mass of the non-compressible fluid so that the fluid-sealing area is divided into a pressure-receiving chamber partially defined by the elastic body and situated on one of opposite sides of the second component, and an equilibrium chamber partially defined by the flexible layer and situated on an other one of opposite sides of the second component; providing an orifice passage for fluid communication between the pressure-receiving chamber and the equilibrium chamber; and forming the at least one gas-retaining hole into the first pre-assembled component so as to be open in an inner surface of the sealing end portion of the first pre-assembled component so that the opening of the at least one gas-retaining hole faces upward within the non-compressible fluid, upon the fixing of the second and the third components with respect to the first component.

According to the method of this mode, the second and third pre-assembled components can be assembled with the first pre-assembled component in a state where the first pre-assembled component is immersed within the mass of the mass member with its opening facing upward, thus facilitating operation for assembling these second and third pre-assembled components with the first pre-assembled component. When these pre-assembled components are assembled together using mechanical automatic facilities, for example, the aforesaid advantages of the present method makes it possible to simplify the structure of the facilities, and to facilitate manufacture of the fluid-filled vibration-damping device. In order to prevent undesirable entry of gas or the like into the fluid-sealing area, it is prefer that the second and third pre-assembled components are subsequently immersed into and assembled with the first component, rather than that the second and third pre-assembled components are assembled together in the atmosphere, before assembled with the first pre-assembled component within the mass of the non-compressible fluid. Preferably, in order to remove gas or the like stuck to the surfaces of the second and third pre-assembled components, the second and third pre-assembled components are subjected to a fluid-blowing treatment within the mass of the no-compressible fluid.

BRIEF DESCRIPTION OF THE DRAWINGS

The forgoing and/or other objects features and advantages of the invention will become more apparent form the following description of preferred embodiments with reference to the accompanying drawings in which like reference numerals designate like elements and wherein.

DETAILED DESCRIPTION OF PREFERRED EMBODIMENTS

Figure 1:
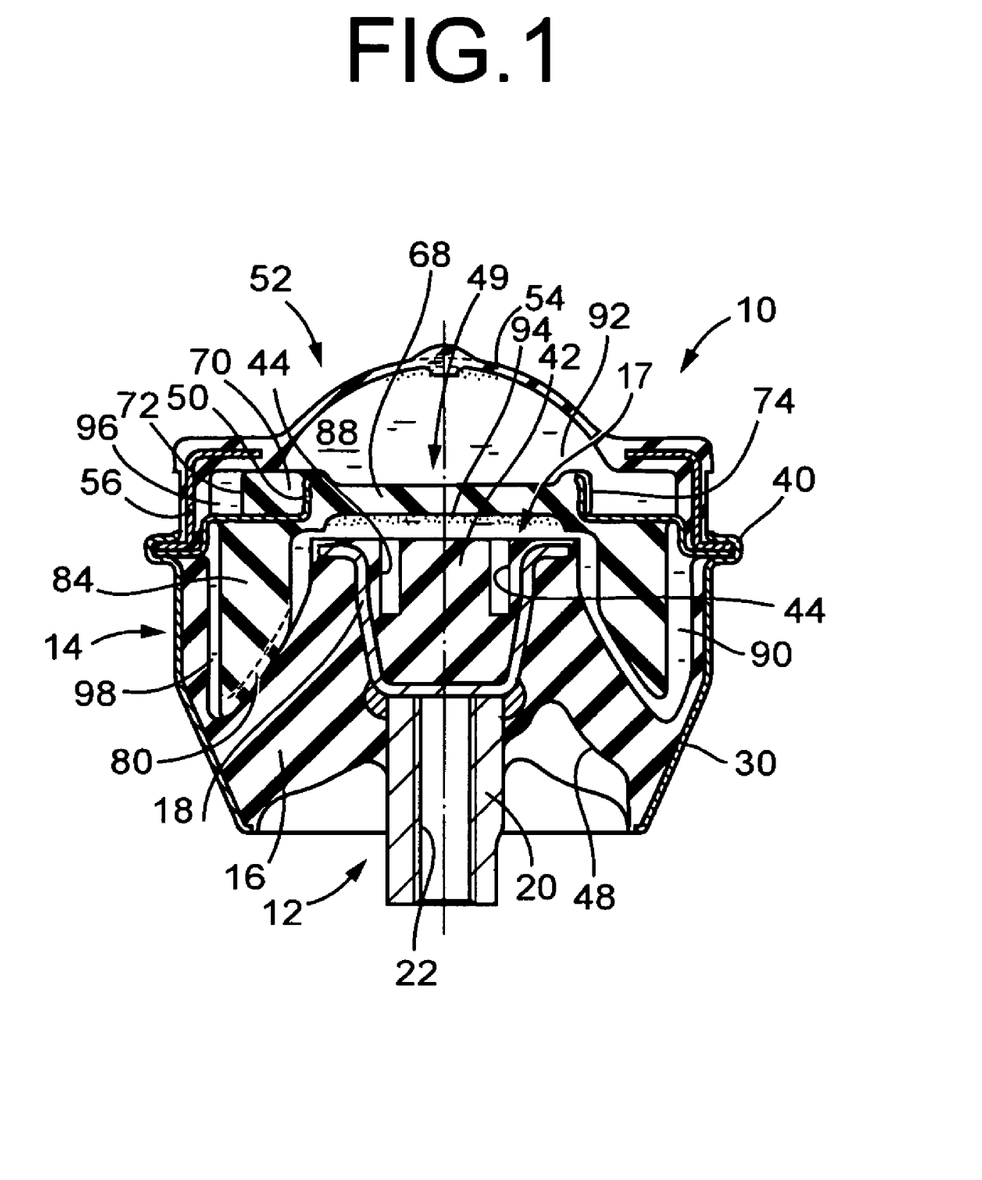
FIG. 1 is an elevational view in axial or vertical cross section of a fluid filled vibration-damping device in the form of an engine mount for use in an automotive vehicle, which is constructed according to a first embodiment of the invention.
Figure 2:
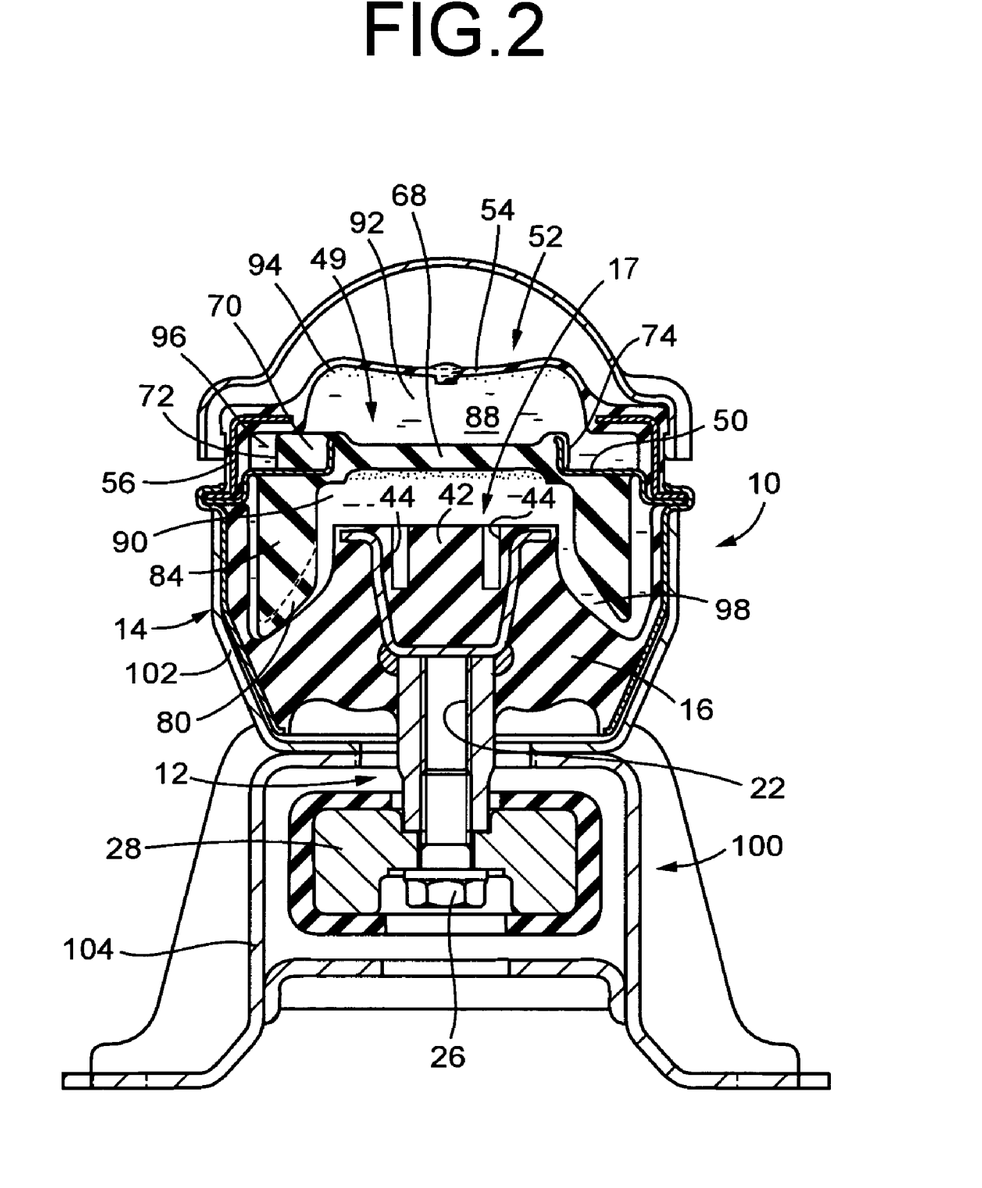
FIG. 2 is an elevational view in axial or vertical cross section of the engine mount of FIG. 1 in a state mounted on an automotive vehicle.

Referring first to FIG. 1, shown is a fluid-filed vibration-damping device in the form of an engine mount 10 constructed according to a first embodiment of the present invention. FIG. 2 shows the engine mount 10 that is installed on an automotive vehicle. The engine mount 10 includes a first mounting member in the form of an inner shaft member 12 and a second mounting member in the form of an outer sleeve member 14, which are both made of metal and disposed in a mutually spaced away relationship with each other. A rubber elastic body 16 is disposed between the inner shaft member 12 and the outer sleeve member 14 so as to elastically connect these members 12, 14 to each other. With the engine mount 10 installed on the vehicle as shown in FIG. 2, the inner shaft member 12 is fixed to a member on the side of a power unit, and the outer sleeve member 14 is fixed to a member on the side of a body of the vehicle, whereby the power unit is elastically supported by the body of the vehicle via the engine mount 10 in a vibration isolating fashion, with the power unit suspended from the body of the vehicle via the engine mount 10. In the following description, the vertical direction will be basically used to refer to an axial direction of the engine mount 10, or the vertical direction as seen in FIGS. 1 and 2.

Described in detail, the inner shaft member 12 includes a cup-shaped metal member 18 and a tubular metal member 20 that is fixed by welding or the like to the bottom of the cup-shaped metal member 18. To an open edge portion of the cup-shaped metal member 18, a flange portion 24 is integrally bonded so as to extend radially outwardly. A bore of the tubular metal member 20 functions as tapped hole 22. By means of a bolt 26 threaded into the tapped hole 22, the tubular metal member 20 is fixedly fastened to a bracket 28 that is fixedly formed on a power unit (not shown), as shown in FIG. 2.

Figure 3:
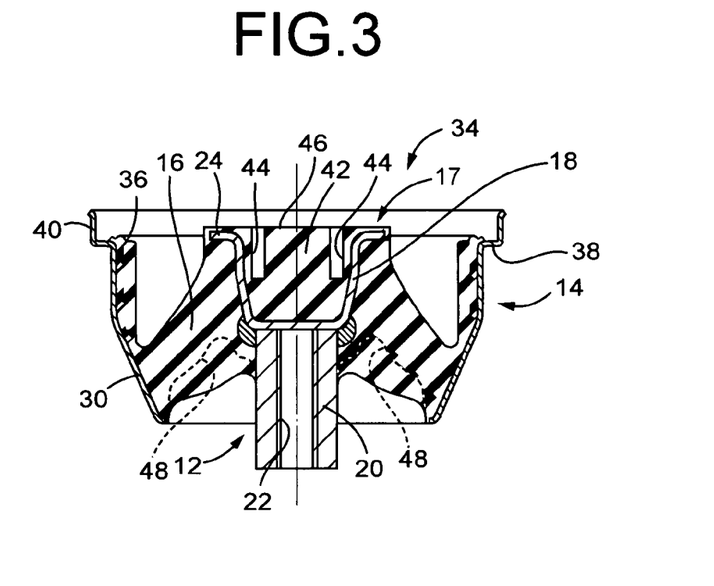
FIG. 3 is a vertical cross sectional view of an integrally vulcanized product of the engine mount of FIG. 1, taken along line 3—3 of FIG. 4.

Referring to FIG. 3, the outer sleeve member 14 is a generally cylindrical thin-walled member having a diameter sufficiently larger than an outer diameter of the inner shaft member 12. The outer sleeve member 14 has a tapered sleeve portion 30 at its axially lower side, whose diameter gradually decreases as it approaches a lower open-end of the outer sleeve member 14. An upper open-end portion 36 of the outer sleeve 14 is shaped to provide an integrally formed stepped portion 38 extending radially outwardly, and a caulking portion 40 of generally cylindrical shape, which is integrally formed at and extends axially upwardly from an outer peripheral portion of the stepped portion 38.

The outer sleeve member 14 is disposed radially outwardly of and coaxially with the inner shaft member 12 with a given spacing therebetween. With this arrangement, a lower end portion of the tubular metal member 20 of the inner shaft member 12 protrudes vertically downwardly from the lower open-end of the outer sleeve member 14.

Figure 4:
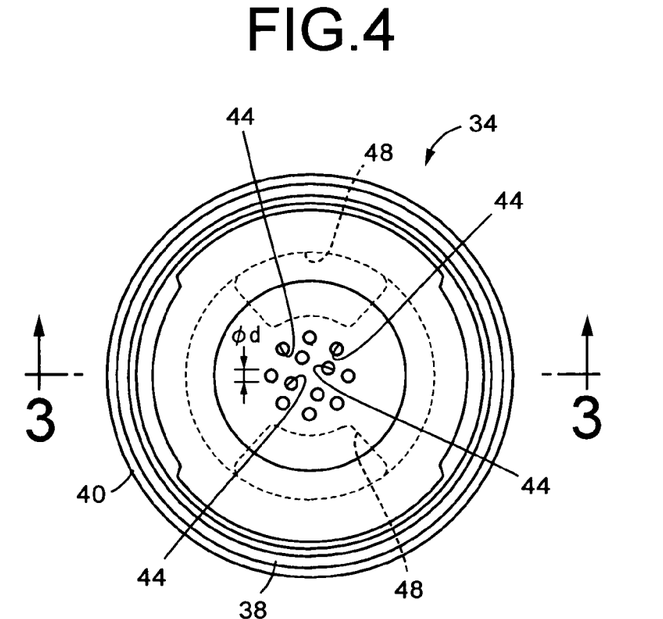
FIG. 4 is a top plane view of the integrally vulcanized product of FIG. 3.

As is apparent from FIGS. 3 and 4, the rubber elastic body 16 is interposed between the inner shaft member 12 and the outer sleeve member 14. The rubber elastic body 16 has a generally inverted truncated conical shape with a diameter gradually increases as it approaches a lower end thereof. The inner shaft member 12 extends through a central portion of the rubber elastic body 16 along a center axis of the rubber elastic body 16, while the rubber elastic body 16 is bonded to an outer circumferential surface of the inner shaft member 12 through a vulcanization of a rubber material for forming the rubber elastic body 16. The flange portion 24 of the cup-shaped metal member 18 of the inner shaft member 12 is bonded by the aforesaid vulcanization to a small-diameter end face of the rubber elastic body 16 while extending over a substantially entire area of the small-diameter end face. The tapered sleeve portion 30 of the outer sleeve member 14 is superposed on and bonded by the aforesaid vulcanization to an outer circumferential surface of a large-diameter end portion of the rubber elastic body 16. With this arrangement, the inner shaft member 12, the outer sleeve member 14 and the rubber elastic body 16 are provided as an integrally vulcanized product 34 serving as a first assembled member. In the integrally vulcanized product 34, the inner shaft member 12 and the outer sleeve member 14 are elastically connected to each other via the rubber elastic body 16 with the lower open-end of the outer sleeve member 14 is fluid-tightly closed by the inner shaft member 12 and the rubber elastic body 16. That is, the lower open-end portion of the outer sleeve member 14 is fluid-tightly closed by a sealing end portion 17 consisting of the first mounting member 12 and the rubber elastic body 16.

The rubber elastic body 16 has a pair of pocket like recessed portions 48, 48, which are open in a large diameter end face of the rubber elastic body 16 at respective positions diametrically opposed to each other with the inner shaft member 12 interposed therebetween. With the pair of recessed portions 48, 48 formed as described above, the rubber elastic body 16 is desirably adjusted in terms of a spring ratio, i.e., a ratio of its spring constant in mutually orthogonal diametric directions.

A hollow space of the cup-shaped metal member 18 of the inner shaft member 12 is filled with a packed rubber 42 bonded to an inner surface of the cup-shaped metal member 18. The packed rubber 42 has a surface 46 that is generally aligned with an open-end face or flange portion 24 of the cup-shaped metal member 18. In the present embodiment, the packed rubber 42 are integrally formed with the rubber elastic body 16. With this arrangement, the cup-shaped metal member 18 embedded within the rubber elastic body 16 functions as a rigid member for preventing elastic deformation of the packed rubber 42 due to a force applied thereto.

The packed rubber 42 is formed with a plurality of gas-retaining holes 44 (e.g., twelve holes in this embodiment). Each gas-retaining hole 44 is open in the surface 46 of the packed rubber 42 and extending axially downwardly from the surface 46 with a given axial length and with a substantially constant circular cross sectional shape, while being entirely defined by a wall formed of the packed rubber 42. Namely, the plurality of gas-retaining holes 44 are open in an inner surface of the sealing end portion 17, such that the plurality of gas-retaining holes 44 are oriented to be open in the same direction. Further, each gas-retaining hole 44 has a diameter $\phi d$ that is suitably adjusted so that, if the gas-retaining hole 44 is oriented with its opening facing vertically upward within a mass of non-compressible fluid (which will be described later), an entry of the non-compressible fluid into the gas-retaining hole 44 is prevented, and a given volume of gas can be retained within the gas-retaining hole 44.

More specifically, the diameter $\phi d$ of each gas-retaining hole 44 should be determined while taking into account comprehensively: density; viscosity or other properties of an employed non-compressible fluid; an affinity of the packed rubber 42 for the non-compressible fluid and gas; a density of employed gas; resistance to contact of the employed gas with the packed rubber 42; a depth dimension of the gas-retaining hole 44; condition of flow or pressure of the non-compressible fluid flowing through the vicinity of the opening of each gas-retaining hole 44; and the like. Practically, a variety of gas-retaining holes 44 having different diameters $\phi d$ were prepared and examined in terms of their gas-retaining capability under practical conditions, and an optimal diameter $\phi d$ of each gas-retaining hole 44 may be experimentally determined based on obtained examined data.

It should be appreciated that the packed rubber 42 defining the gas-retaining holes 44 is entirely surrounded by the rigid cup-shaped metal member 18, and formed within the cup-shaped metal member 18. Therefore, an elastic deformation of the packed rubber 42 is effectively prevented in the event of elastic deformation of the rubber elastic body 16 caused by an application of external force between the inner shaft member 12 and the outer sleeve member 14. With this arrangement, each gas-retaining hole 44 is held in its original form constantly.

The integrally vulcanized product 34 as the first assembled member is assembled with a second assembled member in the form of a partition structure 49 and a third assembled member in the form of a lid structure 52, such that the partition structure 49 and the lid structure 52 are laminated on each other in this order and disposed within a hollow space in the upper open-end portion 36 of the outer sleeve member 14.

Figure 5:
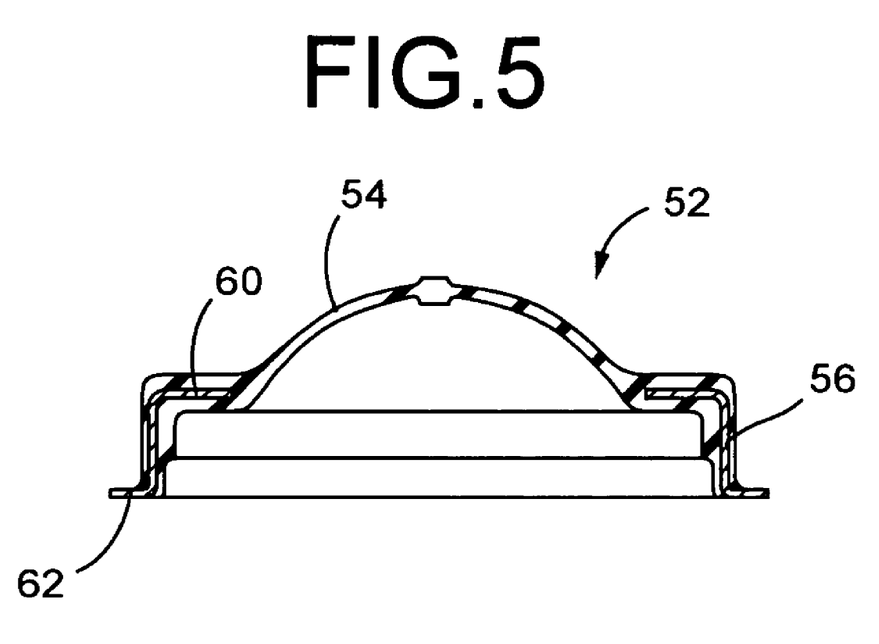
FIG. 5 is a vertical cross sectional view of a lid structure of the engine mount of FIG. 1.

As shown in FIG. 5, the lid structure 52 includes a flexible layer in the form of a flexible diaphragm 54 and a lid metal 56. The flexible diaphragm 54 is a thin rubber member easily deformable, and has a canopy like shape in its entirety with its opening facing vertically downwardly. The lid metal 56 is a generally cylindrical member with a large diameter in its entirety, and includes an inward flange portion 60 integrally formed at its upper open-end so as to extend radially inwardly, and an outward flange portion 62 in integrally formed at its lower open-end portion so as to extend radially outwardly. The lid metal 56 is bonded to an open-end peripheral portion of the flexible diaphragm 54 through vulcanization of a rubber material for forming the flexible diaphragm 54.

Figure 6:
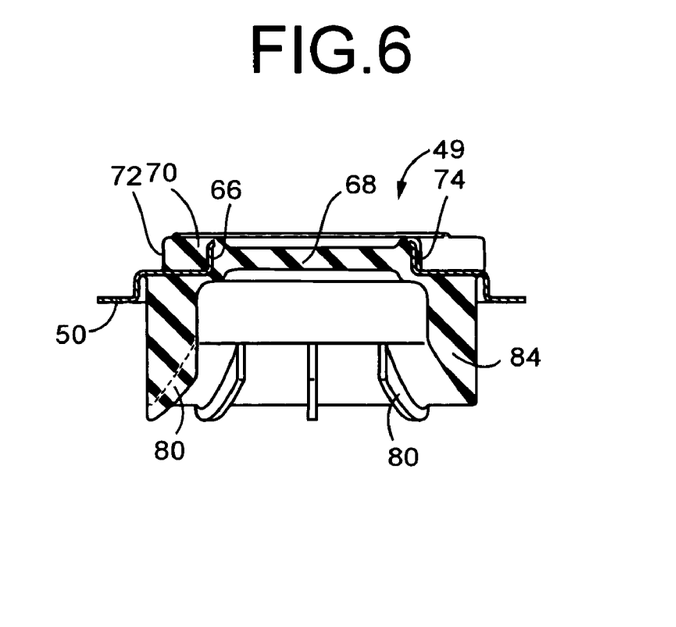
FIG. 6 is a vertical cross sectional view of a partition structure of the engine mount of FIG. 1, taken along line 6—6 of FIG. 7.
Figure 7:
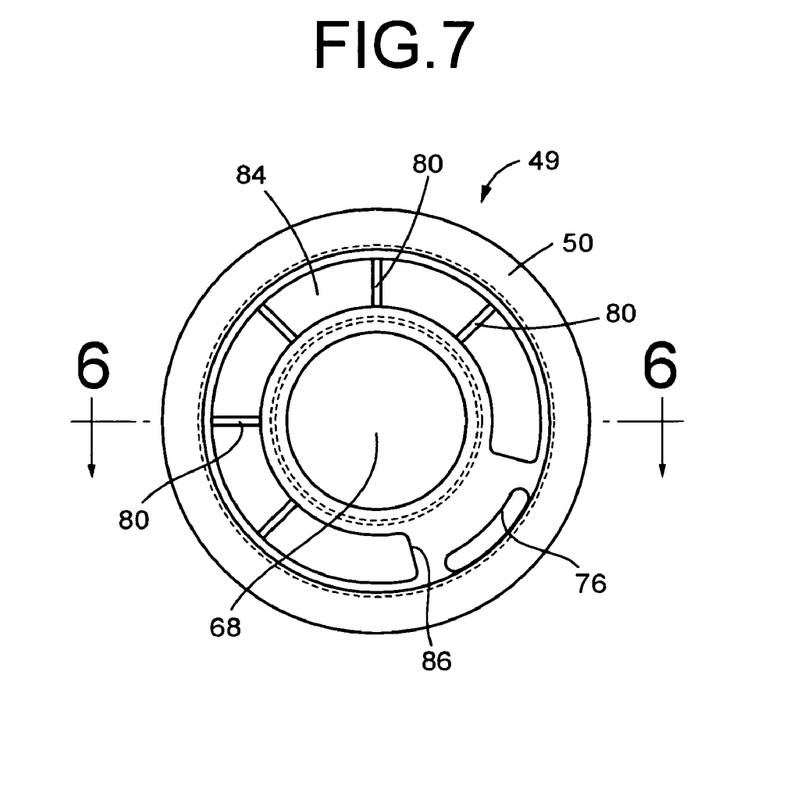
FIG. 7 is a bottom view of the partition structure of FIG. 6.

As shown in FIGS. 6 and 7, the partition structure 49 includes a parting metal 50 and a rubber elastic plate 68. The parting metal 50 is a generally annular plate member having a central hole 66 and a circumferential shoulder in its radially intermediate portion. The rubber elastic plate 68 is disposed within the central hole 66 while extending in a direction perpendicular to an axial direction of the parting metal 50. The rubber elastic plate 68 is bonded at its peripheral portion to an inner peripheral portion of the partition metal 50 in the process of vulcanization of a rubber material of the rubber elastic plate 68.

Also, an annular orifice defining rubber 70 is bonded to an inner peripheral portion of an upper surface of the parting metal 50, in the process of vulcanization of a rubber material for forming the orifice defining rubber 70. With this arrangement, the orifice defining rubber 70 cooperates with the upper surface of the parting metal 50 to define a cutout groove 72 situated on the upper surface of the parting metal 50 and continuously extending in a circumferential direction of the parting metal 50 over a circumferential length somewhat smaller than a circumference of the parting metal 50. One of circumferentially opposite end of the cutout groove 72 is open in a lower surface of the parting metal 50 through a communication hole 76 formed through the parting metal 50, while the other end of the cutout groove 72 extends radially inwardly through a cutout portion 74 formed onto the orifice defining rubber 70, and then is open upward.

Further, a throttle rubber 84 is fixed to the lower surface of the parting metal 50 by means of vulcanization bonding so as to protrude downwardly from the parting metal 50. The throttle rubber 84 is situated on an inner circumferential portion of the parting metal 50, and extends circumferentially over a circumferential length that is somewhat smaller than the circumference of the parting metal 50. As shown in FIGS. 6 and 7, the throttle rubber 84 is a generally cylindrical block member with a relatively large wall thickness. This throttle rubber 84 has a skirt-like protruding end portion, thereby providing an inclined cylindrical inner surface whose diameter gradually increases as it approaches a protruding end of the throttle rubber 84. A plurality of fins 80, each having a thin-plate shape, is integrally formed onto the inclined cylindrical surface so as to project radially inwardly and so as to extend over an axial length of the inclined cylindrical inner surface. The plurality of fins 80 are generally equally spaced apart from one another in a circumferential direction of the inclined surface of the throttle rubber 84. The communication hole 76, which is formed through the parting metal 50 is situated between adjacent ones of fins 80 and open to the interval between the adjacent fins 80.

The partition structure 49 and the lid structure 52 are successively assembled with the upper open-end portion 36 of the outer sleeve member 14 in this order. With this arrangement, an outer peripheral edge of the parting metal 50 and the outward flange portion 62 of the lid metal 56 are laminated on the stepped portion 38 of the outer sleeve member 14 in this order, and integrally fixed to the outer sleeve member 14 by caulking the caulking portion 40 against these structures 52, 49.

With the partition and lid structures assembled with the integrally vulcanized product, the upper open-end portion 36 of the outer sleeve member 14 is fluid-tightly closed by these structures 49, 52. With this arrangement, the rubber elastic body 16 and the flexible diaphragm 54 cooperate to define therebetween a fluid-sealing area 88 situated in an interior of the outer sleeve member 14, and filled with a non-compressible fluid. Within the fluid-sealing area 88, the partition structure 49 is disposed in its horizontal attitude, whereby the fluid-sealing area 88 is divided into two spaces, i.e., a pressure-receiving chamber 90 partially defined by the rubber elastic body 16 on the lower side of the partition structure 49, and an equilibrium chamber 92 partially defined by the flexible diaphragm 54 on the upper side of the partition structure 49. Upon application of a vibrational load between the inner shaft member 12 and the outer sleeve member 14, the pressure of the fluid in the pressure-receiving chamber 90 changes due to elastic deformation of the rubber elastic body 16. On the other hand, a fluid pressure change in the equilibrium chamber 92 is substantially absorbed by elastic deformation of displacement of the flexible diaphragm 54, which causes a change in the volume of the equilibrium chamber 92.

Water, alkylene glycol, polyalkylene glycol, silicone oil or similar materials may be employed as the non-compressible fluid to be filled within the fluid-sealing area 88. For effecting excellent vibration-damping on the basis of resonance of the fluid, low viscosity fluid having viscosity of not larger than 0.1 Pa·s is favorable for use as such fluid.

Within the fluid-sealing area 88, also sealed is a predetermined volume of gas, e.g., air 94 in this embodiment. In the static state where the fluid pressure in the fluid-sealing area 88 is held in a level approximately equal to the atmospheric pressure, the air 94 is contained in the non-compressible fluid in a vapor phase, which is separated from the non-compressible fluid.

With the partition structure 49 and the lid structure 52 assembled together as described above, the cutout groove 72 formed onto the partition structure 49 is covered by the lid structure 52, thereby providing an orifice passage 96 circumferentially extending at an outer circumferential portion of the fluid-sealing area 88. One of circumferentially opposite ends of the orifice passage 96 is held in fluid communication with the pressure-receiving chamber 90 through the communication hole 76, and the other end of the orifice passage 96 is held in fluid communication with the equilibrium chamber 92 through the cutout portion 74, thus permitting flows of the non-compressible fluid through the orifice passage 96 between the pressure-receiving chamber 90 and the equilibrium chamber 92.

The engine mount 10 constructed as described above is installed on the vehicle as shown in FIG. 2, for example. Namely, the inner shaft member 12 is fastened to the bracket 28 by means of bolt 26 screwed into the tapped hole 22 of the inner shaft member 12, and fixed to the power unit (not shown) via the bracket 28. On the other hand, the outer sleeve member 14 is fastened to a bracket 100, and fixed to the body of the vehicle via the bracket 100. The bracket 100 includes a cup shaped metallic holder sleeve 102 and a pair of legs 104 attached by welding to a lower end portion of the metallic holder sleeve 102. The outer sleeve member 14 is press-fitted into a bore of the metallic holder sleeve 102. With this arrangement, the power unit is elastically supported by the body of the vehicle via the engine mount 10 in a vibration-damping fashion, with the power unit suspended from the body via the engine mount 10.

With the engine mount 10 installed in position as described above, upon application of a vibrational load to the engine mount 10, the non-compressible fluid is forced to flow through the orifice passage 96 due to the fluid pressure difference between the pressure-receiving chamber 90 and the equilibrium chamber 92. Thus, the engine mount 10 is able to exhibit excellent vibration-damping effect on the basis of resonance of the fluid flowing through the orifice passage 96 with respect to vibration in a frequency band to which the orifice passage 96 is tuned. For instance, the orifice passage 96 is tuned to a low frequency band including engine shakes or the like.

Further, the rubber elastic plate 68 provided in the central portion of the partition structure 49 is able to exhibit another damping effect. Namely, upon application of a vibrational load having a frequency higher than the frequency to which the orifice passage 96 is tuned, the resistance to flows of the fluid through the orifice passage 96 considerably increases. This makes it impossible for the fluid to flow through the orifice passage 96 between the pressure-receiving chamber 90 and the equilibrium chamber 92, resulting in considerable increase of the fluid pressure in the pressure-receiving chamber 90. In this case, however, the rubber elastic plate 68 is elastically deformed so as to absorb the fluid pressure change in the pressure-receiving chamber 90. With the help of the elastic deformation of the rubber elastic plate 68, the engine mount 10 is free from the problem of considerable increase of the spring stiffness upon application of a vibrational load in an intermediate or high frequency band, thus exhibiting excellent damping effect over a wide frequency range.

Yet further, the throttle rubber 84, which are bonded to the partition structure 49, are projected into the pressure-receiving chamber 90, and annular fluid passage formed around the rubber elastic body 16 is throttled or restricted by the throttle rubber 84 as viewed in a vertical cross section. This arrangement makes it possible to prevent that resonance or flows of the fluid through the annular fluid passage is adversely effected on intended vibration-damping performance of the engine mount 10.

Still further, the predetermined volume of gas-mixed within the fluid-sealing area 88 enables the engine mount 10 to exhibit a low spring constant upon application of high-frequency small-amplitude vibration, with the help of high compressibility of air 94. Also the air 94 contained in the fluid-sealing area 88 makes it possible to prevent or minimize occurrence of vaporizing in the fluid-sealing area 88 due to abrupt pressure decrease in the pressure-receiving chamber 90, upon abrupt application of a rebound load, and resultant occurrence of vibration or noises as a result of burst of air vapors.

It should be appreciated that the aforesaid advantages bringing from the air 94 contained in the fluid-sealing area 88, varies depending on a volume of air 94. The volume of air 94 introduced into the fluid-sealing area 88 can be precisely determined by the volume of the gas-retaining holes 44 formed into the packed rubber 42. There will be described in detail a method of measuring and introducing air 94 by utilizing the gas-retaining holes 44, in the course of manufacturing method of the engine mount 10 by way of example.

Figure 8:
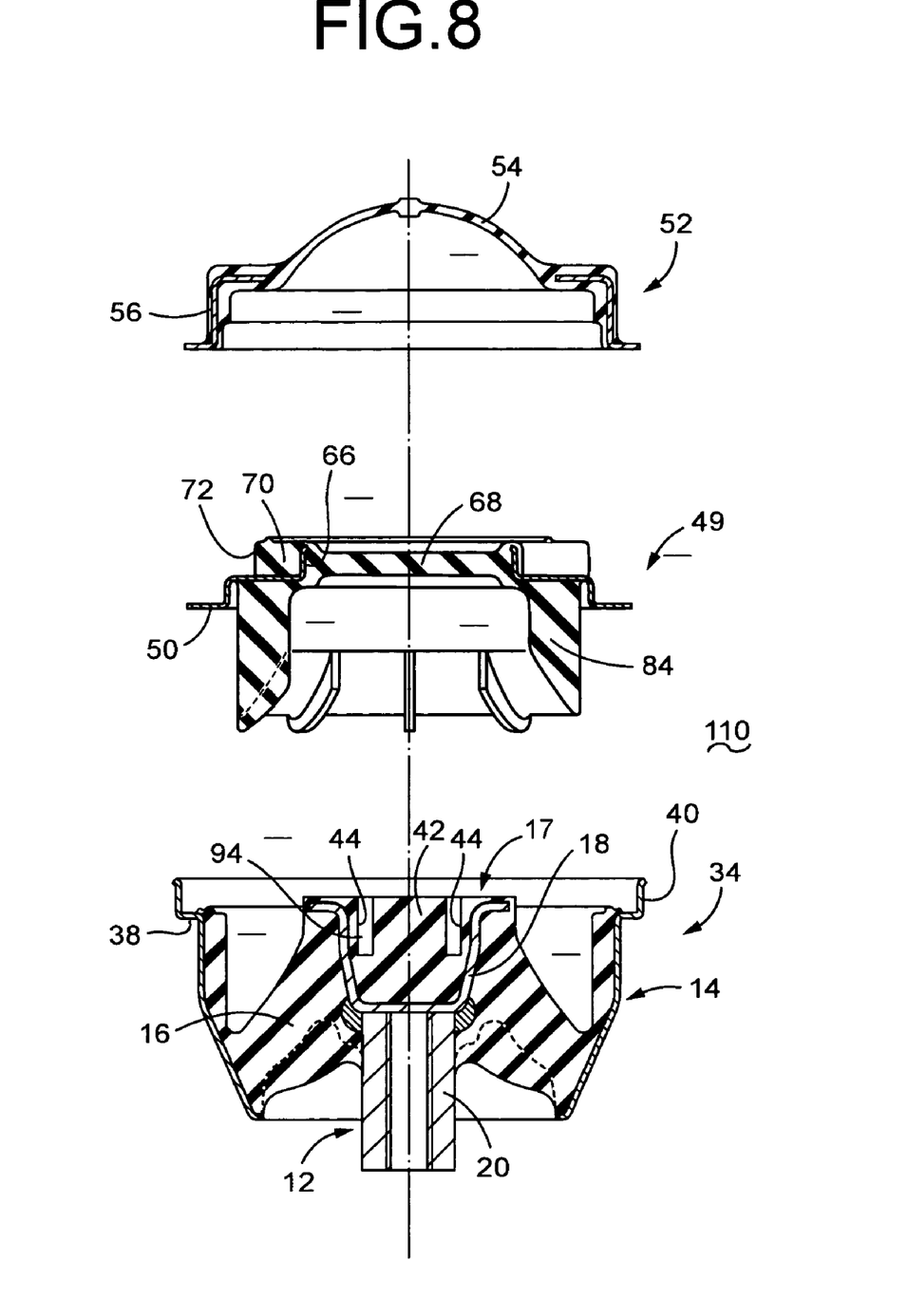
FIG. 8 is a view suitable for explaining a manufacturing method of the engine mount of FIG. 1 according to the present invention.

As is understood from FIG. 8, the integrally vulcanized product 34, the partition structure 49, and the lid structure 52 are formed independently with one another. A suitable tank filled with a non-compressible fluid 110 for filling the fluid-sealing area 88 is prepared, and then the integrally vulcanized product 34 is immersed within a mass of the fluid within the tank.

With the integrally vulcanized product 34 immersed within the mass of the non-compressible fluid 110, the gas-retaining holes 44 of the packed rubber 42 has still retained air 94 contained therein, although opening of the air-retaining holes 44 are exposed to the fluid-sealing area 88. In order to remove air stuck to the surface of the integrally vulcanized product 34, the integrally vulcanized product 34 may be inclined, turned or rotated within the mass of the non-compressible fluid 110, or alternatively may be subjected to a fluid-blowing treatment using a jet of the non-compressible fluid, as needed. In the case where any of the aforesaid treatments are performed, for removing air stuck to the surface of the integrally vulcanized product 34, the shape and/or diameter of the gas-retaining holes 44 should be determined while taking into account adverse effect of these treatments on gas-retaining capability of the gas-retaining holes 44, so as not to undesirably discharge air 94 contained in the gas-retaining holes 44.

Subsequently, the integrally vulcanized product 34 is fixedly supported within the mass of the non-compressible fluid 110 with its upper open-end portion 36 facing vertically upward. Next, the partition structure 49 is immersed within the mass of the non-compressible fluid 110. In order to remove air retained in the surface of the partition structure 49, the partition structure 49 may be inclined, turned or rotated within the mass of the non-compressible fluid 110, and may be subjected to the fluid-blowing treatment using a jet of the non-compressible fluid, as needed. The partition structure 49 is then superposed on the integrally vulcanized product 34 to be situated on the side of upper open-end portion 36 of the outer sleeve member 14, within the mass of the non-compressible fluid 110.

Then, the lid structure 52 is immersed within the mass of the non-compressible fluid 110. Like the partition structure 49, the lid structure 52 may be inclined, turned or rotated within the mass of the non-compressible fluid 110, and may be subjected to the fluid-blowing treatment using a jet of the non-compressible fluid, in order to remove air stuck to the surface of the lid structure 52. The thus treated lid structure 52 is then superposed on the integrally vulcanized product 34 to be situated on the side of the upper open-end portion 36 of the outer sleeve member 14 and to be laminated on the partition structure 49.

With the integrally vulcanized product 34, the partition structure 49, and the lid structure 52 assembled together as described above, the caulking portion 40 of the outer sleeve member 14 is caulked against peripheral portions of the partition structure 49 and the lid structure 52, whereby the partition structure 49 (parting metal 50) and the lid structure 52 (lid metal 56) are firmly fixed at their peripheral portions to the outer sleeve member 14 by caulking.

The foregoing method makes it possible to form the fluid-sealing area 88 including the pressure-receiving chamber 90 and the equilibrium chamber 92, and to fill the fluid-sealing area 88 with the non-compressible fluid, simultaneously. In this state, the plurality of gas-retaining holes 44 are directly open to the fluid-sealing area 88. That is, the fluid-sealing area 88 is formed with all of the gas-retaining holes 44 included as integral parts.

In other words, the fluid-sealing area 88 is formed with a predetermined volume of air 94 contained in the gas-retaining holes 44, and the air 94 contained in the gas-retaining holes 44 is able to be introduced into the fluid-sealing area 88. That is, the fluid-sealing area 88 is filled not only with the non-compressible fluid but also with the predetermined volume of air 94.

While it is possible to still retain the air 94 in the gas-retaining holes 44 when the engine mount 10 is installed on the vehicle, preferably, in the event of installation of the engine mount 10 on the vehicle, the air 94 is discharged from the gas-retaining holes 44 to be dispersed in the pressure-receiving chamber 90 and the equilibrium chamber 92. With this arrangement, the air 94 can be held in contact with the non-compressible fluid at high efficiency, whereby the engine mount 10 can enjoy the aforesaid advantages on the basis of the predetermined volume of air contained in the fluid-sealing area.

Moreover, an volume of air 94 contained in the fluid-sealing area 88 can be precisely determined by a total volume of the plurality of gas retaining holes 44, so that the engine mount 10 of the present embodiment can further effectively and stably exhibit the aforesaid high damping effect with respect to high-frequency small-amplitude vibration, as well as noise or impact moderation effect caused by burst of air vapors occurred in the fluid-sealing area 88 due to abrupt pressure decrease in the pressure-receiving chamber 90.

The air 94 retained in the gas-retaining holes 44 may be held in retained in the gas-retaining holes 44 in a state of installation of the engine mount 10 on the vehicle. Preferably, when the engine mount 10 is installed on the vehicle, the air 94 should be discharged from the gas-retaining holes 44 so that the predetermined amount of air 94 are dispersed over the pressure receiving chamber 90 and the equilibrium chamber 92. With this arrangement, the air 94 can be held in contact with the sealed non-compressible fluid in enhanced efficiency, making it possible for the engine mount 10 to exhibit further enhanced damping effect with the help of the air 94 contained in the fluid-sealing area 88.

The air 94 retained in the gas-retaining holes 44 may be discharged into the fluid-sealing area 88 by only applying to the engine mount 10 an external force in excess of integrated retaining force based on surface tension or other tension to hold the air retained in the gas-retaining holes 44, and enough to cause discharge of the air from the gas-retaining holes 44. Such an external force may be exerted on the engine mount 10 by applying impulsive force or vibration to the engine mount 10, for example. In this case, the shape and size of the gas-retaining holes 44 may be determined in advance, taken into account an external force which will be applied to the engine mount 10 after the aforesaid assembly, so that the air 94 can be discharged due to the external force applied to the engine mount 10. Practically, the gas-retaining holes 44 may be dimensioned so that the air 94 retained in the gas-retaining holes 44 is discharged into the fluid-sealing area 88 due to an external force applied to the engine mount 10 when the engine mount 10 receives a load or weight of the power unit in a production line.

While the present invention has been described in its presently preferred embodiments, it is to be understood that the invention is not limited to the details of the illustrated embodiments, but may be otherwise embodied with various other changes, modifications and improvements, which may occur to those skilled in the art, without departing from the spirit and scope of the invention defined in the following claims.

For instance, while the illustrated embodiment of this invention takes the form of the engine mount 10 for use in an automotive vehicle, the principle of the invention is equally applicable to various types of fluid-filled vibration-damping devices employing a fluid-sealing area containing a predetermined volume of air.

Figure 9:
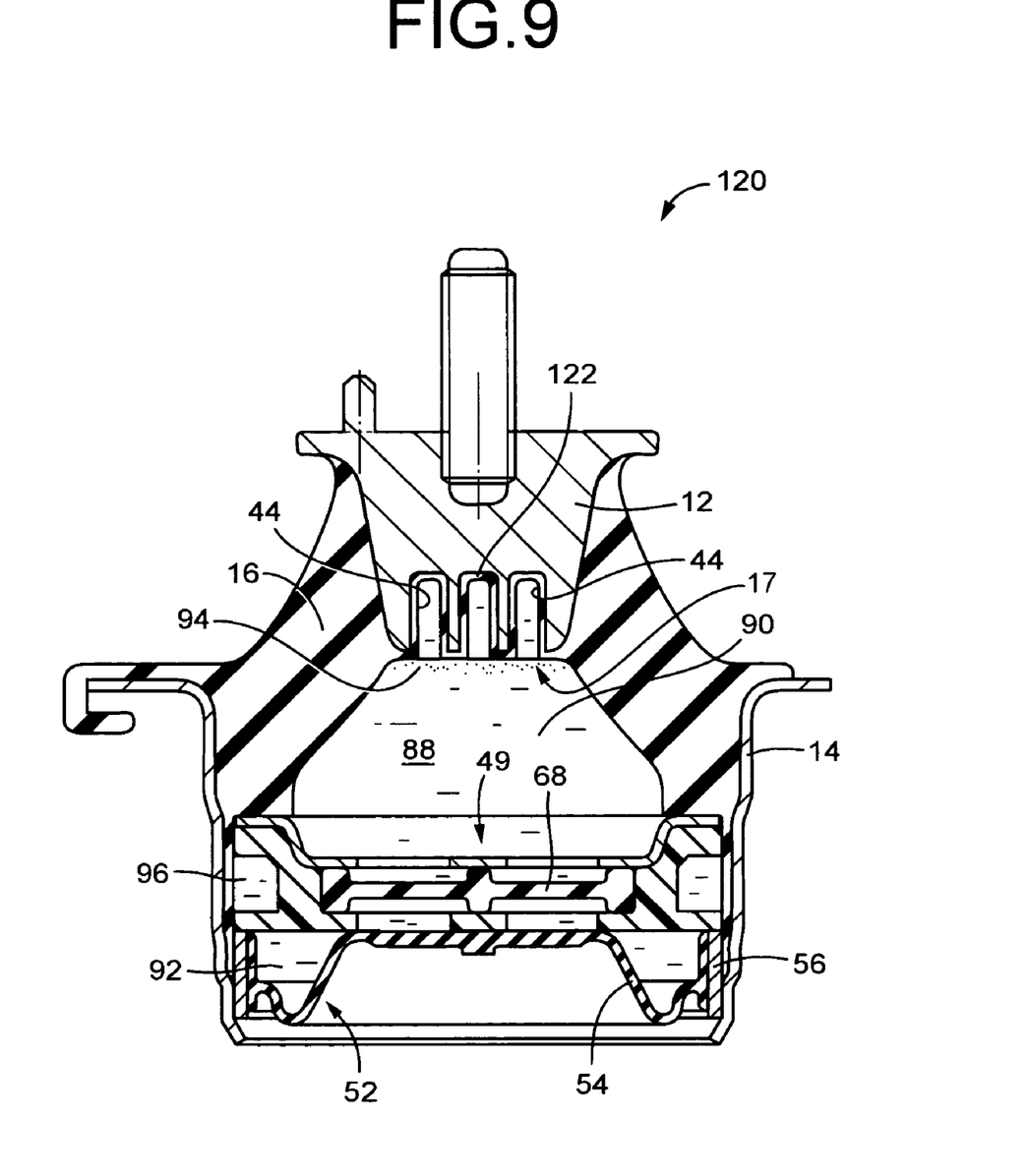
FIG. 9 is an elevational view in axial or vertical cross section of a fluid filled vibration-damping device in the form of an engine mount for use in an automotive vehicle, which is constructed according to a second embodiment of the invention.

Described in detail, the present invention may be applicable to an engine mount of mount type as shown in FIG. 9, other than the engine mount of suspension type in the illustrated embodiment. FIG. 9 illustrates an engine mount 120 of mount type, wherein a static load or weight of a power unit is applied between the inner shaft member 12 and the outer sleeve member 14 so that the inner shaft member 12 is pushed into the outer sleeve member 14.

Figure 10:
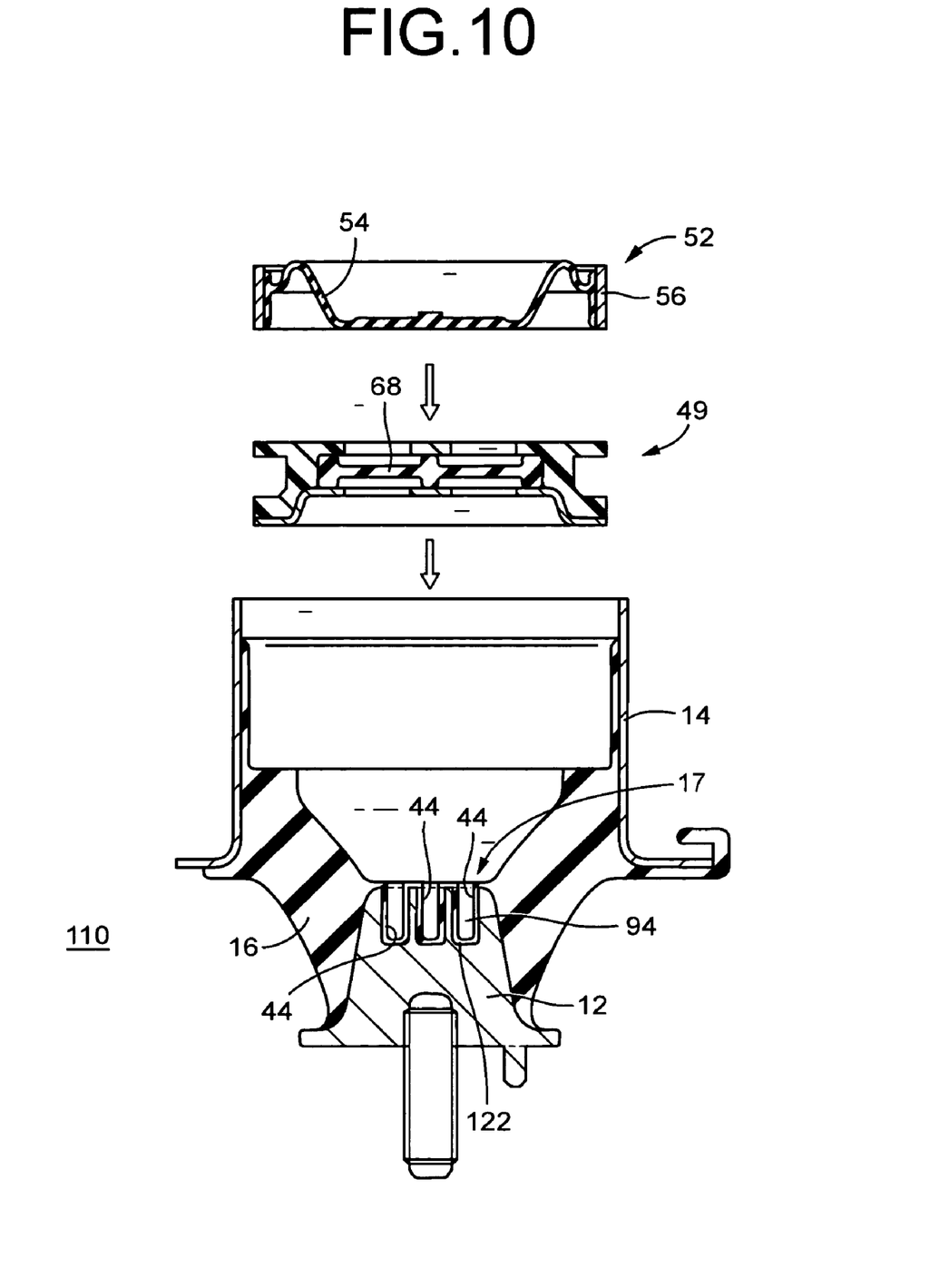
FIG. 10 is a view suitable for explaining a manufacturing method of the engine mount of FIG. 9 according to the present invention.

In FIG. 9, the same reference numerals as used in the illustrated embodiment are used for identifying structurally and functionally corresponding elements, and no redundant description of these components will be provided. As illustrated in FIG. 10, the engine mount 120 may be manufactured similarly to the illustrated embodiment. First, the inner shaft member 12 and the outer sleeve member 14 may be elastically connected to each other by the rubber elastic body 16, to thereby provide the integrally vulcanized product 34. The obtained integrally vulcanized product 34 is the immersed within the mass of the non-compressible fluid 110 with its lower open-end portion of the outer sleeve member 14 facing upwardly. The partition structure 49 and the lid structure 52 are inserted into the lower open-end portion of the outer sleeve member 14 in this order. In this state, the upper open-end portion of the outer sleeve member 14 is subjected to drawing operation in the non-compressible fluid or in the atmosphere, to be fluid-tightly pressed onto the partition structure 49 and the lid structure 52.

In the engine mount 120, the inner shaft member 12 has an inverted truncated conical shape. The inner shaft member 12 includes a fixing bolt projected axially upward from its later diameter and face, and a plurality of gas-retaining holes 44 open in its small diameter end face while being exposed to the fluid-sealing area 88. The inner surface as well as an open-end portion of each gas-retaining hole 44 are entirely coated by a coating rubber layer 122 that is integrally formed with the rubber elastic body 16.

In the engine mount 120 constructed as described above, the fluid-sealing area 88 can be formed with the air 94 retained in the gas-retaining holes 44. This arrangement makes it possible to fill the fluid-sealing area 88 not only with the non-compressible fluid but with the air 94 in an amount corresponding to a total volume of the plurality of gas-retaining holes 44, at the same time when the fluid-sealing area 88 is formed. Accordingly, the engine mount 120 as shown in FIGS. 9–10, is capable of exhibiting excellent advantages of the present invention as discussed above with respect to the illustrated embodiment.

Likewise, the principle of the invention is suitably applicable to a variety of cylindrical vibration-damping devices including suspension bushing as disclosed in the patent publication 2 (JP-A-60-139507), and another type of engine mount adapted to mount a front-engine front-drive (FF) type power unit.

The gas-retaining holes may be formed into a variety of members exposing to the fluid-sealing area, other than the inner shaft member 12 in the illustrated embodiments. For instance, the gas-retaining holes may be formed into expose to the pressure-receiving chamber 90, the equilibrium chamber 92, the orifice passage 96, or the like. It is also possible to form the gas-retaining holes 44 into the partition structure and/or the rubber elastic body. In the case where the gas-retaining holes 44 are formed into the rubber elastic body, the air retained in the gas-retaining holes 44 can be effectively discharged as a result of elastic deformation of the rubber elastic body without needing a special step for applying an external force to the engine mount in order to discharge the air from the gas-retaining holes 44, since the gas-retaining holes 44 are automatically squeezed or banished as a result of the elastic deformation of the rubber elastic body.

What is claimed is:

1. A fluid-filled vibration-damping device for an automotive vehicle, comprising:
    a first mounting member adapted to be fixed to a member on a power unit side of the vehicle;
    a second mounting member adapted to be fixed to a member on a body side of the vehicle, and having a cylindrical configuration, the first mounting member being disposed underneath a lower open-end of the second mounting member with an axial spacing therebetween;
    an elastic body elastically connecting the first and second mounting members so that the lower open-end of the second mounting member is fluid-tightly closed by the elastic body and the first mounting member;
    a flexible layer is disposed so as to fluid-tightly close an upper open end of the second mounting member so that a fluid-sealing area is formed within the second mounting member and is filled with a non-compressible fluid that is forced to flow within the fluid-sealing area upon application of a vibrational load to the fluid-sealing area so as to exhibit vibration-damping effect; and
    at least one gas-retaining hole is formed on a side of the first mounting member so as to open to the fluid-sealing area through an opening thereof facing vertically upward, and capable of retaining a predetermined volume of gas therein with the opening thereof facing vertically upward within the non-compressible fluid, and discharging the gas retained therein into the liquid sealing area when the device is installed between the power unit and the body of the vehicle.

2. A fluid-filled vibration-damping device according to claim 1, wherein the at least one gas-retaining hole is adapted to discharge the predetermined volume of gas retained therein from the opening thereof into the fluid-sealing area in an event of application of a given external force to the device.

3. A fluid-filled vibration-damping device according to claim 1, wherein a wall of the fluid-sealing area is partially defined by a rigid member, and the at least one gas retaining hole is formed into a portion of the wall in which deformation due to a force applied thereto is prevented by means of the rigid member.

4. A fluid-filled vibration-damping device according to claim 1, wherein the fluid-sealing area includes a pressure-receiving chamber partially defined by the elastic body and an equilibrium chamber partially defined by a flexible layer and held in fluid communication with the pressure-receiving chamber through an orifice passage, and the at least one gas-retaining hole is open to the pressure-receiving chamber of the fluid-sealing area.

5. A fluid-filled vibration-damping device according to claim 4, wherein a partition structure is disposed within and supported by the second mounting member so as to divide the fluid-sealing area into the pressure receiving chamber and the equilibrium chamber on the opposite sides thereof, and the at least one gas-retaining hole is open in an inner surface of the sealing end portion.

6. A fluid-filled vibration-damping device according to claim 1, wherein the at least one gas-retaining hole comprises a plurality of gas-retaining holes, and the plurality of gas-retaining holes are oriented to be open in a same direction.

7. A fluid-filled vibration-damping device according to claim 1, wherein the at least one gas-retaining hole has an inner surface made of an elastic material such as rubber and a synthetic resin material.

8. A fluid-filled vibration-damping device according to claim 1, wherein the at least one gas-retaining hole is formed into a portion of the elastic body, which portion does not undergo elastic deformation upon application of a vibrational load between the first and second mounting members.

* * * * *